Dec. 10, 1968  G. S. ERICSON  3,415,292
COIL WINDING AND TRANSFER APPARATUS FOR DYNAMOELECTRIC
MACHINE CORE MEMBERS
Filed Sept. 23, 1966  4 Sheets-Sheet 1

WITNESSES
Theodore F. Wrobel
E. Strickland

INVENTOR
Gene S. Ericson
BY
F. P. Lyle
ATTORNEY

Dec. 10, 1968     G. S. ERICSON     3,415,292
COIL WINDING AND TRANSFER APPARATUS FOR DYNAMOELECTRIC
MACHINE CORE MEMBERS
Filed Sept. 23, 1966     4 Sheets-Sheet 4

United States Patent Office 3,415,292
Patented Dec. 10, 1968

3,415,292
COIL WINDING AND TRANSFER APPARATUS FOR DYNAMOELECTRIC MACHINE CORE MEMBERS
Gene S. Ericson, Cridersville, Ohio, assignor to Westinghouse Electric Corporation, Pittsburgh, Pa., a corporation of Delaware
Filed Sept. 23, 1966, Ser. No. 581,488
14 Claims: (Cl. 140—92.1)

ABSTRACT OF THE DISCLOSURE

Apparatus for winding dynamoelectric machine coils and transferring the wound coils directly to the finger elements of coil transfer apparatus. A support is provided having a plurality of coil forms thereon, each coil form having an opening therein adapted to receive the distal end portions of a group of adjacent finger elements. Means are provided for moving the support means successively to position the coil forms adjacent winding apparatus for winding the coils thereon, and for simultaneously moving all of the coils forms to a second position in which the forms are located with the finger elements extending toward the forms and with the openings in the forms having the distal end portions of respective groups of finger elements received therein so that the coil may be transferred from the form directly onto the groups of finger elements.

---

The present invention relates to a coil winding apparatus using coil generating molds or forms. The apparatus provides for the simple and easy movement of the forms from the winding location to a location expedient for the removal of the wound coils from the forms such as the location of a dynamoelectric machine stator core member disposed to receive the coils. The invention is particularly adaptable for use with coil and slot wedge inserting devices having a comb structure designed to hold the dynamoelectric machine core member for the coil and wedge inserting process.

Heretofore the coils have been wound on a generating form of a coil winding machine, then removed from the form by hand and either manually transported or otherwise conveyed (such as by truck, cart, conveyor belt or the like) to the area of the coil inserting device which may be located relatively near the coil winding machine or a great distance away from the machine, depending upon the layout of the plant in which the machines are employed. In either case, the coils are then placed by hand over elongated finger elements forming the comb structure to be inserted in the slots of a stator core member disposed thereover. Thus, the prior art has not provided a means or method for effecting a quick and easy transfer of the coils from the winding location to a location expedient for their removal from the generating forms. The present disclosure describes an invention that provides such a means and method.

Briefly, in accordance with the principles of the invention, a coil generating and comb loading apparatus is disclosed which comprises a movable coil generating form cluster or assembly and a wire winding or wrapping mechanism. The coil form assembly is mounted on slidable guide rods which allow the assembly to be presented to the wire winding mechanism and to a location expedient for the removal of the wire wound coil such as the location of the above-mentioned comb on a coil inserting device. The coil form assembly comprises a plurality of coil form heads, the number of heads depending upon the number of poles in the dynamoelectric machine to be wound. The assembly is made rotatable so that each head can be individually presented to the wire winding mechanism for wrapping of a coil or coils thereon.

The guide rods are further supported in a pivotal manner so that when the heads are positioned over the comb they may be brought into mesh with the comb to permit the coils wrapped on the forms to be simply and easily slipped from the forms into engagement with the teeth forming the comb structure. The mesh is accomplished by providing each coil form with a transverse slot designed to simultaneously accommodate the teeth.

The coil form is further made collapsible so as to release the grip of the form on the coil to permit easy removal of the coil.

The comb teeth of the coil inserting device correspond to the teeth of a stator core member so that when the core member is disposed on the comb, the spaces or slots between the comb teeth correspond to the slots in the core. The comb teeth thus form a pattern such that the slots are radial and receive the coil which is to form the pole group of the finished winding. The coil forms are therefrom formed to provide the coil with a shape that presents a straight, non-curvature zone corresponding to the radial pattern of the comb slots. When the core to be wound has more than one coil per pole winding, the coil form is provided with a unitary stack of molds, each of which is provided with flat portions forming a radial pattern with a common center and dimensions corresponding to the radial pattern of the comb when viewed along its longitudinal axis.

Accordingly, an object of the invention is to provide a transportable coil winding form assembly for effecting a simple and easy transfer of coils from the winding location thereof to a nearby location expedient for their application to a device adapted for their use.

A more specific object of the present invention is to provide an efficient and effective means and method for winding coils for stator cores and for transferring the coils from the point of winding to a location closely adjacent thereto and expedient for their insertion into the stator cores.

These and other objects of the invention will become more apparent upon consideration of the following detailed description along with the attached drawings, in which.

Figure 1:
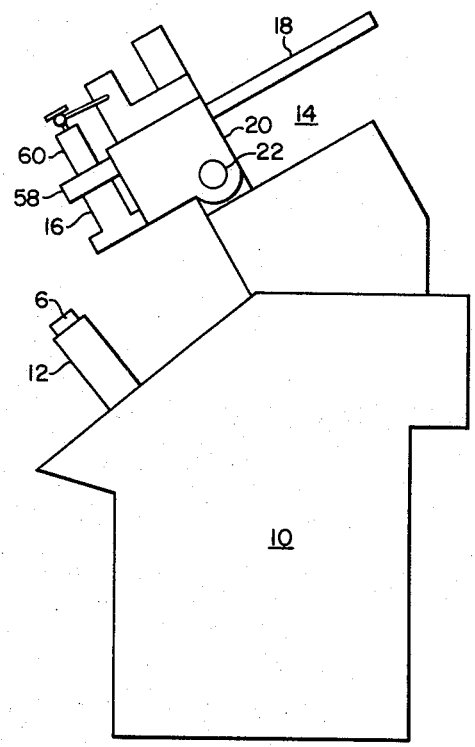
FIGURES 1 and 2 are side profile views of the coil winding and transfer apparatus constructed in accordance with the principles of the present invention, in combination with a coil inserting apparatus, with the transfer apparatus shown in two different positions.
Figure 2:
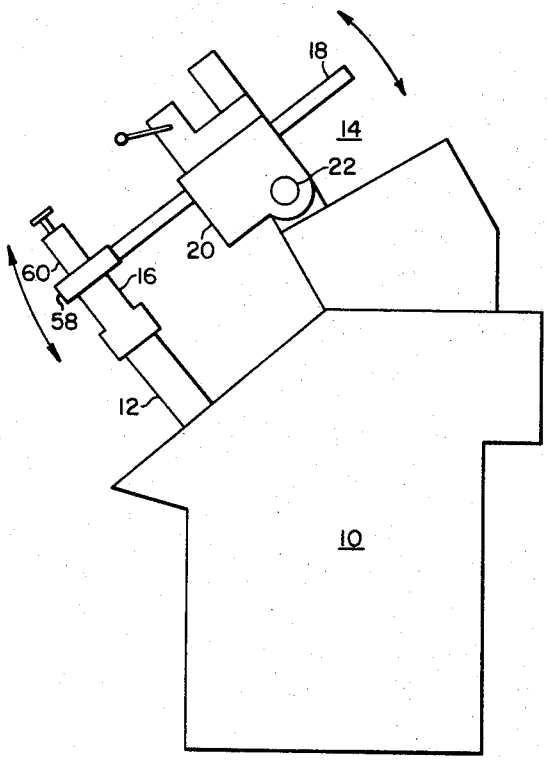

Specifically, there is shown in FIGS. 1 and 2, a coil and slot wedge inserting device generally designated 10, having a comb structure 12 designed to receive coil windings and a stator core of a dynamoelectric machine. The inserting device is of a type generally well known in the industry, such for example as the one disclosed in U.S. Patent 2,432,267 issued Dec. 9, 1947 to A. P. Adamson, the details of which form no part of the present invention except insofar as the device has utility with the invention.

FIGS. 1 and 2 show further a profile view of the novel coil winding and transfer apparatus 14 mounted on the inserting device for use in conjunction therewith and functioning in a manner to be more fully explained hereinafter. The apparatus 14 generally comprises a coil generating form or mold cluster or assembly 16 supported on parallel sliding rod or bar structures 18 and 19 (see FIGS. 3 and 4) extending through a housing and support structure 20 pivotal about a horizontal axis indicated at 22. The housing and support structure further includes a wire winding mechanism 24 (FIG. 3) for winding the coil on the coil forms.

In FIG. 1, the coil form assembly 16 is shown in its winding position adjacent the winding mechanism (in structure 20) for the winding operation. When the winding operation is completed, the assembly is released and moved to a new location, via sliding bars 18 and 19, as shown in FIG. 2. At the new location, the assembly is pulled down over the comb structure 12 or other suitable coil receiving means by the operator by virtue of the support structure 20 being pivotal about point 22. The coils (not shown) wound on the coil forms are released and pulled down onto the comb structure in a manner to be more fully explained hereinafter. After the coils are removed from the forms, the assembly 16 is returned to its winding position for repetition of the winding operation.

Figure 3:
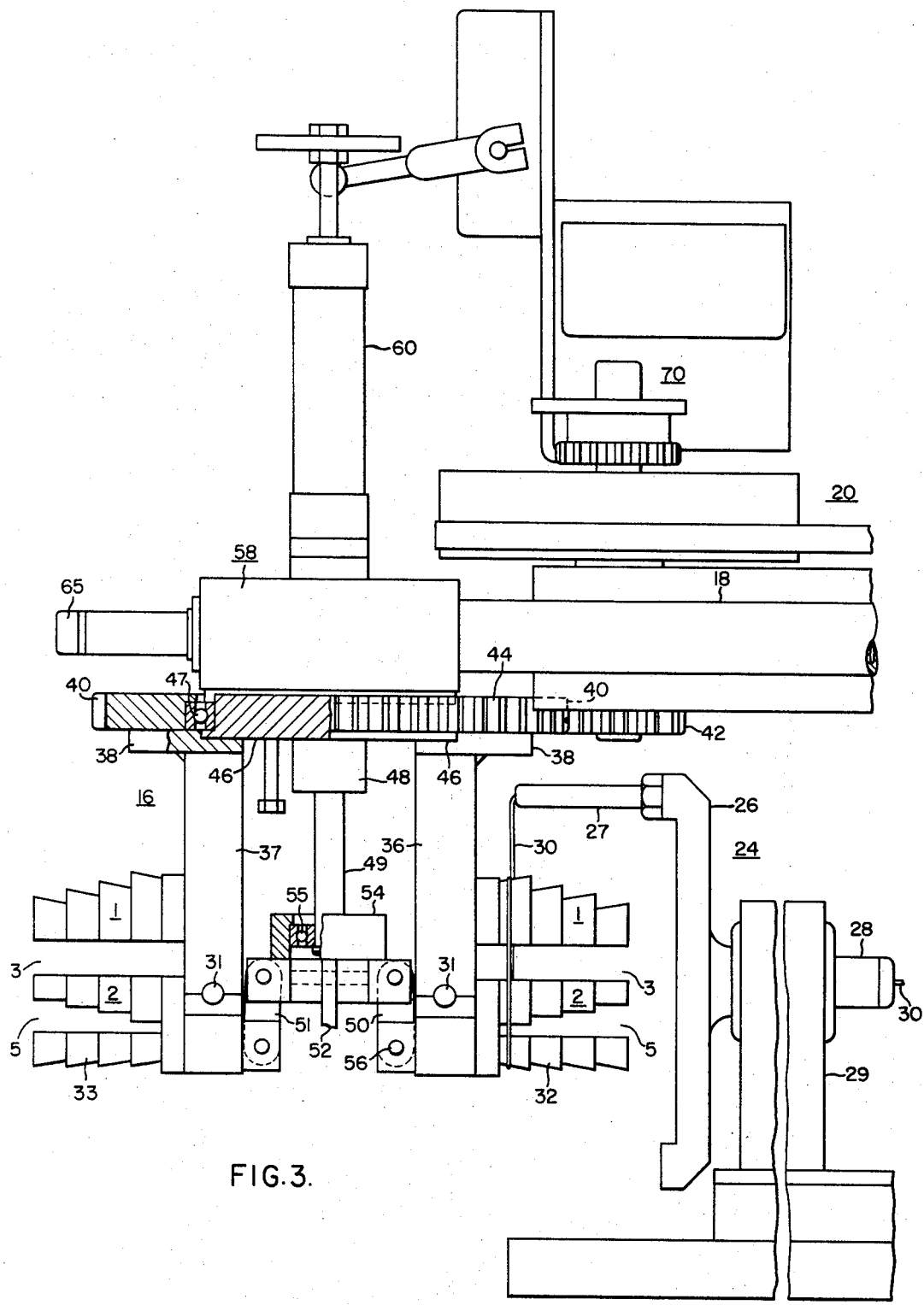
FIG. 3 is an enlarged and partial side elevation view of the coil winding and transfer apparatus with the coil winding forms in their winding position.

FIG. 3 shows a detail elevation view of the coil form assembly 16 in winding position adjacent the aforementioned winding mechanism generally designated 24. The winding mechanism comprises a rotating wire gun or flyer device 26 having an end discharge portion 27 and a mounted axle portion 28 suitably supported by a structural member 29. The wire gun 26 and its discharge and axle portions are provided with a central opening or bore for passing a continuous strand of wire 30 therethrough.

Figure 4:
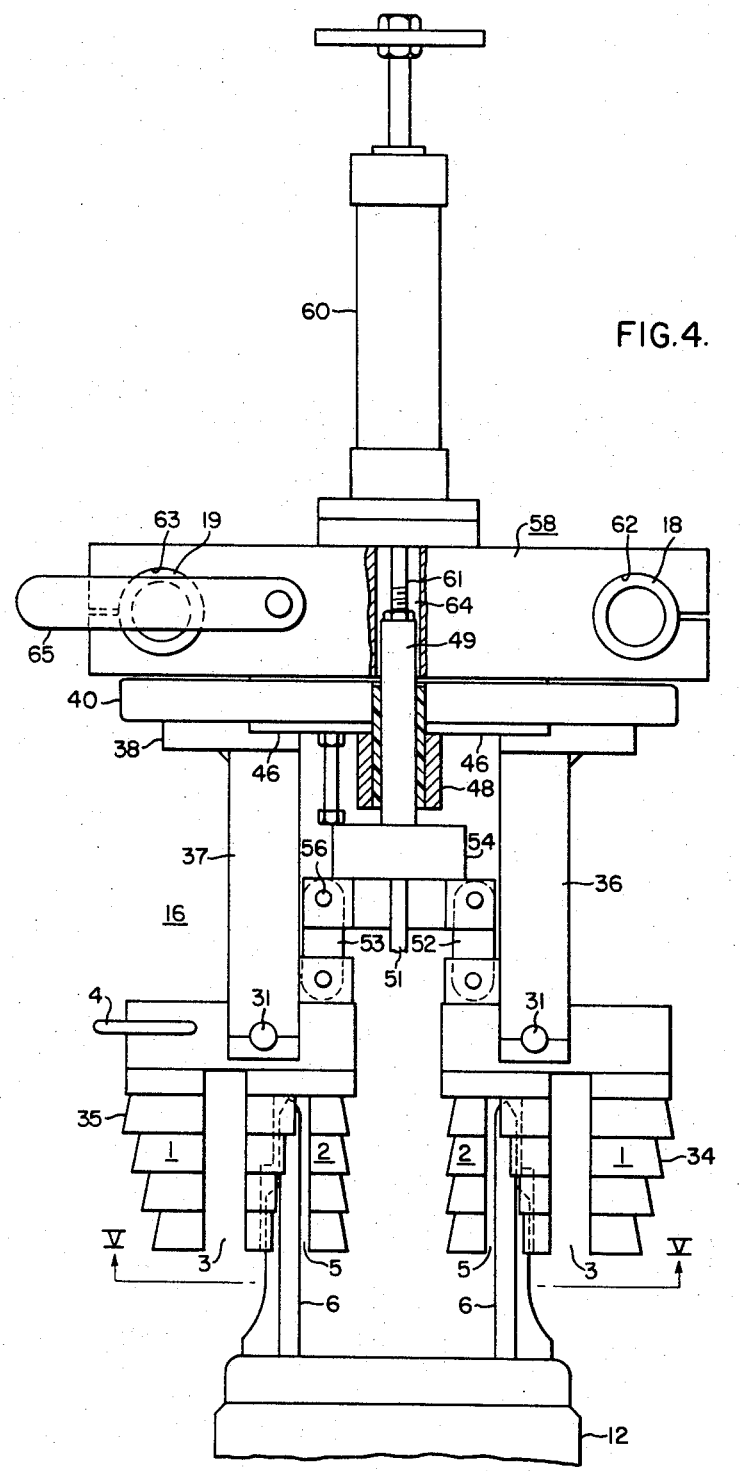
FIG. 4 is an enlarged and partial front elevation view of the coil winding and transfer apparatus showing a coil winding form in mesh with the teeth of the comb structure of a coil inserting apparatus.

The coil form assembly 16, as shown in FIGS. 3 and 4, comprises four pivotally mounted and collapsible coil form heads 32, 33, 34 and 35. For the purpose of clarity, only two heads are shown in each of FIGS. 3 and 4. The heads are disposed at right angles to each other in a horizontal plane so that assembly 16 presents a symmetrical cross configuration when viewed from the top or bottom thereof, a bottom end view being shown in FIG. 5. Thus, in FIG. 3, head 32 is in winding location adjacent the wire gun 26 while the other three heads are positioned away from the winding location.

As mentioned earlier, the number of heads corresponds to the number of poles in the dynamoelectric machine to be wound. Any suitable number of heads may be used in the present invention, four being shown only for purposes of illustration.

Each head comprises two separate portions or sections 1 and 2 defining a transverse open area 3. At least one of the sections is made movable relative to the other section so that each coil form may be collapsed by movement of one section towards the other when a suitable release and lock mechanism (not shown) is manually or automatically operated by way of handle or lever means 4. In FIGS 3 and 4, the section 1 is the movable portion (of the head structures 32 to 35) with the lock and release lever 4 (FIG. 4) shown associated therewith though the invention is not limited thereto. The stationary portion is section 2.

Figure 5:
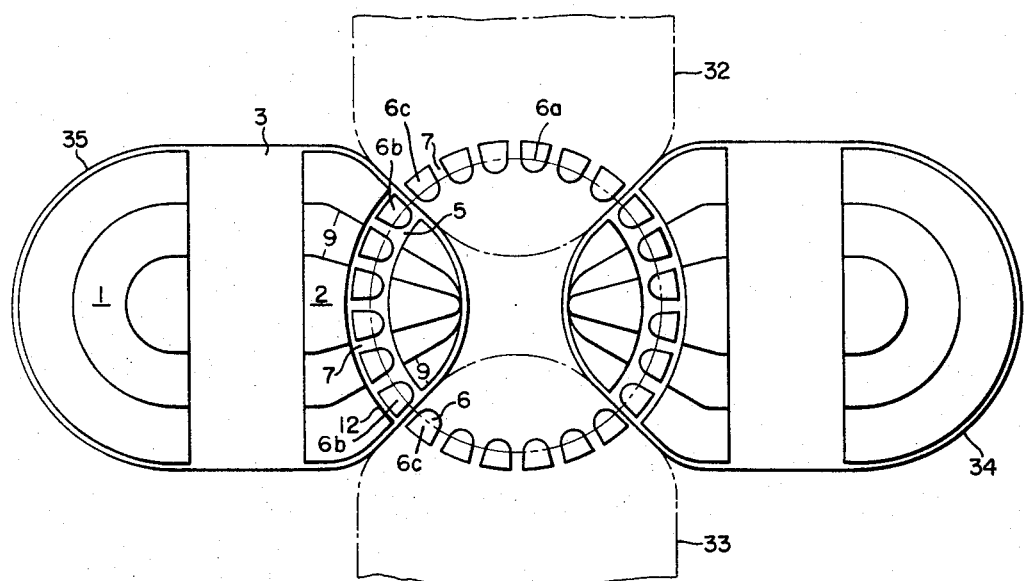
FIG. 5 is an end view of the coil winding forms in mesh with the teeth, taken along line V—V of FIG. 4.

Each of the coil form heads 32 to 35 is further provided with a second recess means or transverse opening 5 located in the stationary portion 2 and and curved to fit, with clearance, the contour of a circular array of upwardly or outwardly extending teeth or finger members 6 which may form part of the comb structure 12 generally depicted in FIGS. 1 and 2 or other suitable type finger member structures. FIGS. 4 and 5 show teeth 6 extending into the recess means 5 for the purpose of removing coils from the coil form heads 32 to 35 to the circular array of teeth. Together the curved transverse openings or recess means 5 in the four heads form arcs of a circle $6a$ when viewed along the longitudinal axis of the heads as best seen in FIG. 5. The circle $6a$ is indicated by a dashed line having radii $6r$ as shown in FIG. 6.

Figure 6:
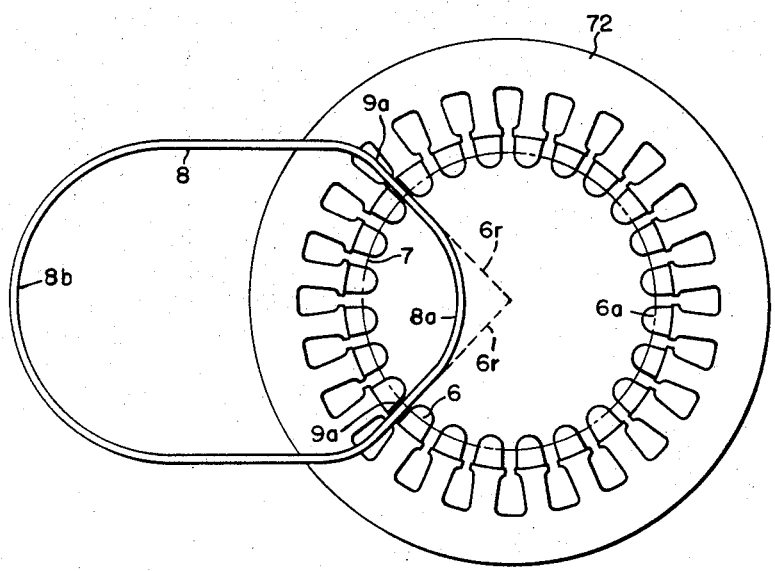
FIG. 6 is an end outline view of the comb teeth supporting a stator core and a single coil.

Between each of the teeth 6 is an opening or slot 7 provided to receive a coil winding 8 such as shown in FIG. 6; together, the teeth form a radial pattern of slots. In order to have the coil enter the comb slots, the coil form head must have a shape that presents flat, straight loop sections or zones 9 corresponding to the radial pattern of the slots 7 and extending along the radii $6r$ of the circle $6a$ as best seen in FIGS. 5 and 6. When the winding 8 is wound on the form, straight loop sections $9a$ are thus formed in the winding which diverge outwardly along the radii $6r$ from an inner end section $8a$ to an outer opposite end section $8b$ as shown in FIG. 6. The finger members 6 on each immediate side of the straight sections 9 are designated $6b$ and $6c$ respectively in FIGS. 5 and 6.

Since most motors have more than one coil per pole, it is necessary to have several distinct shapes for the completed coil group or skein (not shown). Thus, in FIGS. 3 through 5, the coil form heads take a stepped block configuration having tapered and concentric molds for winding four concentric coils though the invention is not limited thereto. As best seen in FIGS. 3 and 4, the concentric molds have different breadth dimensions and are longitudinally superimposed. To provide the completed coils with the proper shape each of the molds is formed to have the flat zones or sections 9 with a common center and dimensions corresponding to the flat portions of the comb teeth when viewed axially as shown in FIG. 5. Thus, the concentric mold structure forms progressively smaller molds having their straight edge sections 9 defining progressively smaller angles between respective radii of the circle $6a$ as best seen in FIG. 5.

The coil form heads 32 to 35 are pivotally suspended by pins 31 disposed in downward extending support members or arms 36 and 37 respectively. The arms are secured to a horizontally disposed plate structure 38 in a suitable manner such as by welding. In FIG. 3, the heads are folded in an outward direction so that the end of the head 32 in winding position faces the coil generating mechanism 24. This is done to provide clearance for the wire wrapping discharge portion 27 of wire gun 26 to pass between the coil form heads.

Immediately above plate structure 38, and attached thereto, is disposed an annular rotating plate structure 40 effective to rotate the coil forming head structures into and out of the winding position when driven by a drive gear 42. The annular plate structure 40 is provided with an externally geared surface 44 disposed in mesh with the drive gear 42 as shown in FIG. 3. The annular plate structure is supported on a fixed and centrally disposed supporting plate means 46 by bearing means 47 as shown in FIG. 3.

The plate means 46 further provides, along with hub portion or extension 48, a support and guide path structure for a centrally disposed shaft 49 (see FIG. 4) mechanically linked to the head structures 32 to 35 by link pieces 50 to 53 respectively and a hub portion 54 (corresponding to hub portion 48). Pin means 56 are provided to mechanically couple the link pieces to the head structures and the hub portion 54. The link pieces and the pins provide the means by which the head structures are made pivotal. Bearing means 55 (FIG. 3) are provided between the shaft 49 and hub portion 54 to allow the coil forming head structures and their associated support structures to rotate therearound.

Immediately above fixed plate means 46 is located carriage structure 58 suitably attached to sliding bars 18 and 19 and to fixed plate means 46 to support the same. The carriage structure further provides a support platform for an air cylinder 60 adapted to actuate the shaft 49 which is mechanically connected thereto by rod 61 as shown in FIG. 4. Carriage structure 58 is provided with two internal parallel openings 62 and 63 constructed to secure the two parallel bars 18 and 19 respectively therein. Carriage structure 58 is further provided with a vertically extending opening 64 designed to accommodate shaft 49 and its mechanical connecting rod 61. The air cylinder 60 may be bolted or otherwise suitably secured to the platform structure 58.

In operation, a handle means 65 is manually employed to move the carriage 58 and assembly 16 into the winding position. A locking means, actuated by the handle, secures carriage and assembly in place. To automate the commencement of the winding operation, a switch device (not shown) may be strategically located so as to be actuated by the aforementioned lock means when handle means 65 is turned to lock the assembly in place. The switch device, when actuated (closed), applies power to a motor in the winding mechanism 24 to start the winding process. The motor rotates the wire gun 26 which functions to wrap the wire 30 around the form in place beginning with the largest mold size as shown in FIG. 3.

The winding operation may be further automated so that it is practical to wind a group of coils as a continuous wire advancing from one mold size to the next when proper number of turns are wound in place. In such a case, winding mechanism 24 is actuated to move a controlled distance away from the coil winding form for each coil size completion. This is accomplished by a suitable indexing means (not shown) actuated by the coil winding mechanism.

When the four coil sizes are completed, the motor driving the winding mechanism is turned off by a switch device actuated by the indexing means and the form assembly 16 is rotated to place a second coil form in winding position. This is accomplished by the operation of drive gear 42 functioning to rotate the plate structure 40 supporting the coil forms as explained earlier. Drive gear 42 is driven by a motor which may be turned on and off by a switch device automatically actuated by a second indexing means disposed above the sliding bars 18 and 19 and generally designated 70.

The above operation is repeated for each coil form in the assembly 16, the direction of winding being reversed with the indexing of each coil form to provide alternate north and south poles. When the fourth and final winding operation is completed, the indexing means functions to stop the winding process, and a wire cutting means (not shown) is operated to automatically sever the wire 30 in preparation for the removal of the coil form assembly 16 from its winding position.

With the winding process complete, the operator releases the carriage 58 from the winding position (via operation of handle 65) and pulls the carriage, and the coil form assembly 16 supported thereon, in a direction away from the place of winding to a position disposed directly over the comb structure 12. When the winding is complete for all molds a valve means is actuated to motivate a piston in the air cylinder 60 which causes (via shaft 49 and linkage components 50 to 53) the coil form heads 32 to 35 to drop down so that the heads face in the downward direction shown in FIG. 4. Thus, when the assembly 16 is in position above the comb 12, the heads are facing in the downward direction in preparation for meshing with the upwardly extending comb teeth 6. The sliding bars 18 and 19 are provided with a stop means so as to limit the outward extended movement of the carriage 58 and assembly 16 to a position in line over comb 12 so that the transverse openings 5 in the heads 32 to 35 are directly in line with the comb teeth 6.

With the carriage 58 (and the assembly 16) in its extended position over comb 12, the operator then pulls the carriage and assembly down towards the comb (see FIG. 2) until the four heads of the assembly mesh with the upwardly extending comb teeth 6 as best seen in FIG. 4. To remove the coil wound on the heads, the operator may easily flip lever means 4 expediently located on each head to release the lock mechanism maintaining each head in its expanded state. When the lock mechanism is released, the movable section 1 travels towards section 2 thereby effectively collapsing the mold. The operator then quickly and easily manually guides the coil skeins from the molds down into the spaces 7 between comb teeth 6. With the coils removed from the heads, the operator resets (expands) the heads to their winding size by operation of lever 4 and returns the form assembly 16 to its winding position. While the next set of coils are being wound, a stator core member 72 (FIG. 6) may be placed over the comb teeth, and the coil and wedge inserting device 10 is operated to insert the coils and wedge into the core slots.

As the carriage 58 and form assembly 16 are returned to the winding location, air cylinder 60 is again actuated to position the heads 32 to 35 in the outwardly folded position shown in FIG. 3.

The levers 4 employed to control the expansion and contraction of the coil form heads may be operated automatically instead of by hand as described. For example, the levers may be provided with cam surfaces designed to ride against fixed operating surfaces provided in the path of the levers when the coil form heads change position by actuation of air cylinder 60.

It should now be apparent from the foregoing description that a unique means and method have been disclosed for winding stator core coils and providing for their transfer to a location for the insertion thereof into the core in a quick and easy manner. The present invention further provides a simple and easy method of placing the coil on the comb of a coil and wedge inserting device without the inefficient and therefore costly method of manually handling the coils from a conveying means, such as a cart, truck, or belt, and placing the coils on the comb by hand. The means employed involve a unique combination of components including a cluster or assembly of collapsible coil forms rotatable in front of a coil winding means and supported on a pivotal, sliding bar structure that allows the assembly (with coils wound thereon) to be easily transferred to a proximate location for quick disposal of the coils into a core member.

Though the invention has been described with a certain degree of particularity, it should be apparent that modifications are possible within the spirit and scope of the invention. For example, the invention has been described in connection with a coil and slot wedge inserting device 10; the use of the invention, however, is not limited to device 10. The unique coil winding and transfer apparatus disclosed herein would have utility in and of itself as well as with other types of apparatus. Thus, the invention is not limited to the particular details illustrated, but includes in its broadest aspects all equivalent embodiments and modifications.

What is claimed is:

1. A coil winding and transfer apparatus for use with a stator coil transferring device having a plurality of spaced, parallel, elongated finger elements respectively having distal end portions, said coil winding and transfer apparatus comprising at least one coil form having an opening therein adapted to receive said end portions of said finger elements, means for supporting said coil form, and means for movably mounting the support means for movement between a first position in which the coil form is positioned for winding a coil thereon and a second position in which the coil form is positioned with said finger elements extending toward the form and with said opening having said end portions of said finger elements received therein for transferring the coil directly thereto.

2. The apparatus of claim 1 in which there are a plurality of said coil forms on said support means, said mounting means including means for moving said support means and said plurality of coil forms successively into position for winding coils thereon, said mounting means including other means for simultaneously moving all of said forms to said second position thereof, all of said forms being positioned in said second position simultaneously to receive said end portions of respective groups of said finger elements in the respective openings for simultaneously transferring the coils directly thereto.

3. The apparatus of claim 1 in which said support means includes means for movably mounting the coil form thereon for pivotal movement about a horizontal axis between a winding position and a coil transferring position.

4. The apparatus of claim 1 in which said coil form opening is adapted to receive a substantial portion of said finger elements in intermeshing relationship in said second position.

5. For use in winding dynamoelectric machine stator coils and transferring the same to a plurality of elongated transfer finger members which are disposed in spaced, parallel, upstanding relationship on at least a part of a circle; a coil form having means thereon for shaping a coil to have two generally straight loop sections respectively joined by opposite end sections with said straight sections diverging outwardly from one end section along radii of said circle, said shaping means having recess means therein lying on said circle, said recess means being adjacent said straight loop sections and adapted selectively to receive at least two of said finger members extending generally at right angles to a plane including said coil with said two finger members and two other finger members respectively immediately adjacent thereto forming two pairs of finger members respectively extending on either side of and closely adjacent said straight loop sections, whereby said coil may be transferred from said shaping means to said finger members.

6. The coil form of claim 5 wherein said shaping means comprises a coil shaping mold having surface portions respectively defining said radii and adapted to shape said straight loop section, said mold having said recess means therein and communicating with said surface portions.

7. The coil form of claim 6 wherein said form has opposite ends longitudinally spaced apart in a direction at right angles to said plane, said form comprising a plurality of said molds for respectively shaping a plurality of concentric coils, said molds being progressively smaller and arranged in longitudinally superimposed, stepped relationship from one end to the other of said form, each of said molds having another surface portion joined to said first-named surface portions and adapted to shape said one end section of the respective coil, said molds having said other surface portions in general longitudinal alignment, progressively smaller molds having their said first-named surface portions defining progressively smaller angles between the respective radii, said recess means extending in said longitudinal direction and communicating with said first-named surface portions of each of said molds.

8. The coil form of claim 7 wherein said recess means is an arcuate opening extending transversely between said first-named surface portions of each of said molds.

9. In winding and transfer apparatus for dynamoelectric machine stator coils; a coil transfer device including a plurality of elongated finger members disposed in spaced, parallel, upstanding relationship on at least a part of a circle and respectively having distal end portions; and a coil form having at least one means for shaping a coil loop thereon including portions for respectively forming two opposite end loop sections and other portions intermediate said first-named portions for respectively forming two generally straight side sections respectively joining said opposite end sections with said straight sections diverging outwardly from one end section along radii of said circle, said other portions having recess means therein lying on said circle and exposed to said straight loop sections for selectively removably receiving the distal end portions of at least two of said finger members extending axially generally at right angles to a plane including said loop, another two finger members respectively immediately adjacent said first-named two finger members being respectively positioned adjacent and laterally outwardly from said other portions, said first-named two and other two finger members respectively forming two pairs of finger members respectively extending axially on either side of and closely adjacent said straight loop sections, said finger members extending axially outwardly from said shaping means whereby said loop may be transferred from said shaping means to said finger member.

10. The apparatus of claim 9 wherein said coil form has opposite ends axially spaced apart in a direction normal to said plane, said shaping means comprising a coil shaping mold having surface portions respectively defining said radii and adapted to shape said straight sections of said coil loop, said mold having said recess means formed therein extending longitudinally inward from one of said ends toward the other and communicating with said surface portions, said other two finger members being respectively positioned adjacent and laterally outwardly from said surface portions, said finger members extending axially outwardly from said one mold end.

11. In combination: a coil form for winding dynamoelectric machine-stator coils, said form having portions for respectively forming two opposite end sections of a coil loop thereon and other portions intermediate said first-named portions for respectively forming two generally straight side sections of said loop which diverge outwardly from one of said end sections, said form having at least one recess formed therein communicating with said other portions and exposed to said straight loop sections; and a coil transfer device comprising a plurality of elongated finger elements having distal ends and inner ends mounted on a support in a curved array and upstanding therefrom in spaced, parallel relationship, said recess removably receiving said distal ends of first finger elements, said first finger elements and other of said finger elements immediately adjacent thereto and respectively on opposite sides thereof respectively receiving said straight loop sections therebetween with said one loop end section being disposed radially inwardly of said finger elements, whereby said loop may be transferred from said form to said finger elements.

12. The combination of claim 11 further comprising means for selectively relatively moving said coil form and transfer device between a first position in which said form and device are in spaced-apart relationship and a second position in which said distal ends of said first finger elements are received in said recess.

13. The combination of claim 12 wherein said form and device in said first position are spaced-apart in the direction of elongation of said finger, said moving means relatively moving said form and device in said direction.

14. The combination of claim 12 wherein there are a plurality of said forms, said device including a plurality of groups of said first and other finger elements respectively corresponding to said plurality of forms, said moving means relatively moving all of said forms simultaneously between said positions thereof, said distal ends of said first finger elements of each group being received in said recess of the respective form in said second position whereby the coil loops on all of said forms may be simultaneously transferred to said finger element groups.

References Cited

UNITED STATES PATENTS

| | | | |
|---|---|---|---|
| 2,432,267 | 12/1947 | Adamson | 29—205 |
| 3,036,603 | 5/1962 | Moore | 140—92.1 |
| 3,151,638 | 10/1964 | Hill | 140—92.1 |
| 3,331,403 | 7/1967 | De Young | 140—92.1 |

CHARLES W. LANHAM, *Primary Examiner.*

LOWELL A. LARSON, *Assistant Examiner.*

U.S. Cl. X.R.

140—1; 29—205